Dec. 27, 1960   A. H. DICKINSON   2,966,300
COUNTER RESPONSIVE TO SHAFT ROTATION
Filed Dec. 29, 1953   3 Sheets-Sheet 1

Fig. 1

INVENTOR.
ARTHUR H. DICKINSON
BY
ATTORNEYS

Dec. 27, 1960     A. H. DICKINSON     2,966,300
COUNTER RESPONSIVE TO SHAFT ROTATION
Filed Dec. 29, 1953     3 Sheets-Sheet 3

Fig. 3

INVENTOR.
ARTHUR H. DICKINSON
BY
Campbell, Brumbaugh, Free & Graves
ATTORNEYS

2,966,300

COUNTER RESPONSIVE TO SHAFT ROTATION

Arthur H. Dickinson, Greenwich, Conn., assignor to International Business Machines Corporation, New York, N.Y., a corporation of New York Filed Dec. 29, 1953, Ser. No. 400,899

14 Claims. (Cl. 235—103)

The present invention relates to electronic register or counter apparatus and, more particularly, to novel and improved electronic counter means responsive to the rotation of a shaft.

Shafts which are adapted to rotate at very high speeds are finding increasing use in present day industrial equipment. In many of these applications of rotating shafts, it is desirable to accurately determine the number of shaft revolutions and fractions thereof. Conventional mechanical measuring apparatuses including direct mechanical linkages to the rotating shaft have proven unsatisfactory for high speeds of shaft rotation. Further, mechanical counting apparatuses have proven undependable and inaccurate when the speed of shaft rotation fluctuates over a wide speed range. On the other hand, numerous types of electrical counting apparatuses have been found to be overly complex or, when simplified, have been found to be inaccurate.

It is, therefore, an object of the invention to provide novel and improved electronic apparatus for measuring shaft rotation and for providing a digital manifestation of the number of shaft revolutions and fractions thereof accurately to the least increment.

In accordance with the invention, a non-mechanical linkage, including a synchro generator, a plurality of synchro control transformers, a plurality of associated discriminators, and an electronic counter, may be coupled to the rotating shaft in such a manner as to actuate the electronic counter under conditions exactly similar to those where a shaft and a mechanical counter are directly connected. In other words, the counter at all times must register shaft revolutions and fractions thereof accurately to the least increment, must be capable of operation at various rates of speed from an infinitely low speed to a maximum allowable speed, and must be capable of forward and reverse travel.

The shaft, of which the extent of motion is to be determined, positions the rotor of the synchro generator and the stator of the generator is electrically connected to each primary of the plurality of control transformers. The secondaries of the control transformers are maintained stationary and, in number, are less than the number of the sub-multiples of one shaft revolution to be determined. Each of the secondaries is aligned at a different axial position. The position of the synchro generator rotor determines the amount of error voltage appearing in a transformer secondary. The position of the rotor of the synchro generator also determines whether such error voltage is in-phase or 180° out-of-phase with the alternating current potential applied to the rotor of the synchro generator.

Associated with each control transformer secondary is a discriminator circuit. When the shaft passes from one incremental position to the next, the discriminator circuit related to each of the positions provides one of two possible output pulses. The output pulse is indicative of the fact that a least increment of the shafts travel has been traversed and acts to shift the amount registered on the electronic counter by a unitary quantity.

For a better understanding of the invention, reference may be had to the following detailed description taken in conjunction with the accompanying figures of the drawing; in which:

Fig. 3 is an electrical circuit diagram of a quinary counter type register means suitable for use in either of the embodiments of Figs. 1 and 2, in accordance with the invention.

In order to simplify the disclosure, the conventional heating circuits for the various electron discharge devices of the system are omitted, suitable sources of positive plate potential are designated by terminals with a (+) sign, and suitable sources of negative biasing potential are designated by terminals with a (−) sign. As an aid in understanding the operation of the system, the triode section of each of the trigger circuits of Figs. 1 and 3, which is initially conductive at the start of the overall measuring operation, with the shaft at its zero position, is shaded. Further, typical wave forms representative of the significant signals to be carried over certain of the conductors have been placed adjacent to these conductors. Designations also have been placed adjacent to the conductors leading from certain of the double-stability trigger circuits to indicate what condition of the double-stability trigger circuits associated therewith will produce the electrical potentials on these conductors to partially enable the gating means connected thereto.

Figure 1:
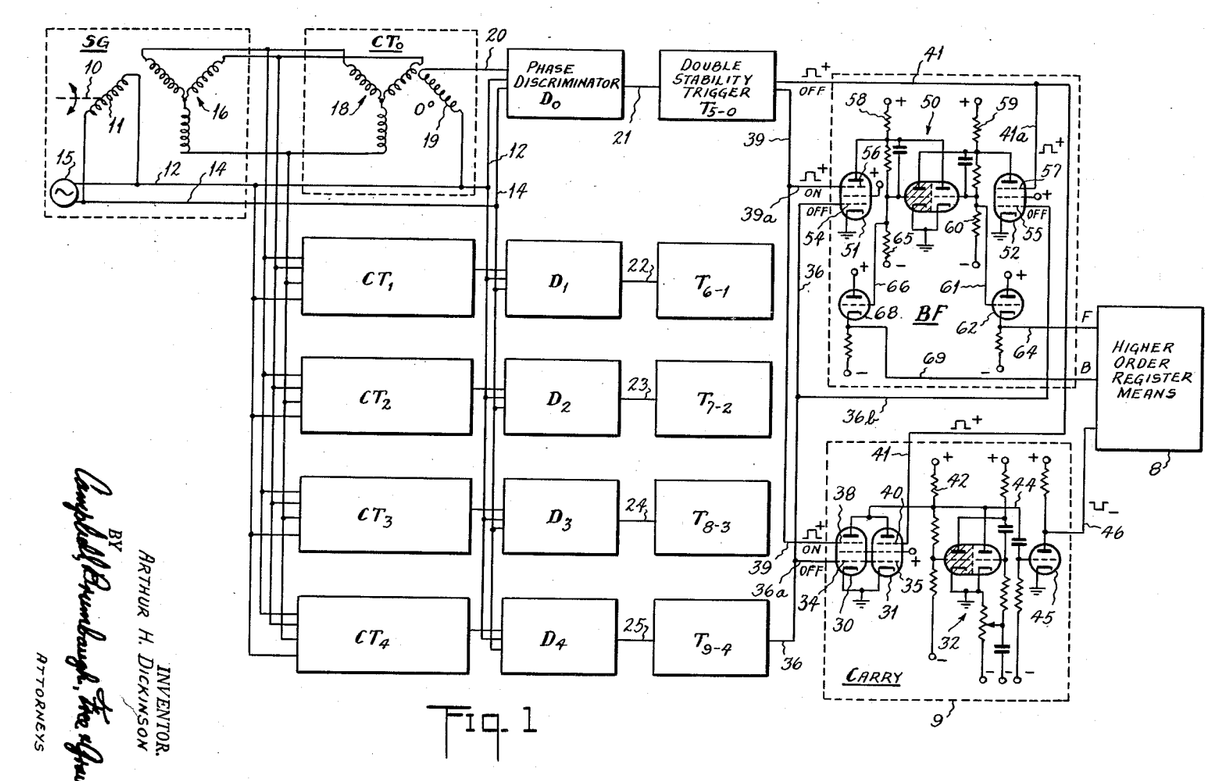
Fig. 1 is an electrical schematic diagram of one embodiment of the invention.

Referring now to Fig. 1, the system may include a conventional synchro generator SG coupled to a plurality of conventional synchro control transformers $CT_0$, $CT_1$, $CT_2$, $CT_3$, and $CT_4$. The individual control transformers may be coupled through phase discriminators $D_0$, $D_1$, $D_2$, $D_3$, and $D_4$, respectively, to a plurality of conventional double-stability trigger circuits $T_{5-0}$, $T_{6-1}$, $T_{7-2}$, $T_{8-3}$, and $T_{9-4}$, respectively. The outputs of the double-stability trigger circuits $T_{5-0}$ and $T_{9-4}$ may be coupled through a carry means 9 to a higher order register means 8. The direction of operation of the higher order register means may be controlled by a switching device BF connected between the double-stability trigger circuits $T_{5-0}$ and $T_{9-4}$, and higher order register means 8.

The rotating shaft 10 may be directly coupled to the rotor 11 of the synchro generator SG which may be connected across alternating current supply leads 12 and 14. The supply leads 12 and 14 may be directly connected to a suitable source of alternating current potential 15. A Y-wound stator 16 of the synchro generator SG may be connected in a conventional manner to Y-wound primaries 18 of the synchro control transformers $CT_0$–$CT_4$, inclusive.

There are preferably half as many synchro control transformers as there are sub-multiples of one shaft revolution to be measured. Since the preferred embodiment of Fig. 1 includes five synchro control transformers $CT_0$–$CT_4$, it will be apparent that ten sub-multiples of one shaft revolution may be determined by the system. The rotor-secondary 19 of the control transformer $CT_0$ may be locked in an axial position corresponding to or aligned with the rotor 11 of the synchro generator SG when the shaft 10 is in its zero position. The rotor-secondaries 19 of the remaining control transformers $CT_1$–$CT_4$ may then be locked in incremental sub-multiple positions with their axes spaced apart by 36°. For example, since the rotor-secondary 19 of the control transformer $CT_0$ is at 0°, the control transformer $CT_1$ may be set for 36° and the control transformer $CT_4$ may be set for 144°.

In accordance with the discussion in Article 6, Chapter 12, of "Principles of Radar," second edition, MIT Radar School Staff, 1946, "error" voltages are produced in each of the rotor-secondaries 19 which are a function of the angular position of the rotating shaft 10 and the rotor 11 of the synchro generator SG. The amplitude of this error voltage varies sinusoidally as a function of the position of the rotor 11 and has two zero or null points. For example, in the rotor-secondary 19 of the control transformer $CT_0$, these two null points would occur at 0° and 180°, whereas the null points for the control transformer $CT_1$ would occur at 36° and 216°.

The null points indicate the points at which the phase relation between the error voltage in the rotor-secondary 19 and the line voltage across the alternating current leads 12 and 14 changes. For example, the error voltage in the rotor-secondary 19 of the control transformer $CT_0$ is in phase with the line voltage when the rotor 11 of the synchro generator SG is positioned at any point between 0° and 180° from the axial position of the rotor-secondary 19, and is 180° out-of-phase with the line voltage when the rotor 11 is positioned at any point between 180° and 360° from the axial position of the rotor-secondary 19.

The phase discriminators $D_0$ through $D_4$, inclusive, may each have two inputs, one of which may be the line voltage from the source 15 supplied by means of the leads 12 and 14. The other inputs to the discriminators $D_0$–$D_4$, may be the error voltages across the rotor-secondaries of the control transformers $CT_0$–$CT_4$, respectively. Thus, the output of the rotor-secondary 19 of the control transformer $CT_0$ may be connected to the discriminator $D_0$ by means of a conductor 20 and the lead 12. The phase discriminators $D_0$–$D_4$ may take the form of any suitable conventional discriminator circuit which may be adapted to provide an in-phase output signal and an out-of-phase output signal. For example, the discriminators $D_0$ through $D_4$ may be designed in accordance with the disclosure in the United States patent to Harper, No. 2,521,365.

The output signals produced by the phase discriminators $D_0$ through $D_4$ in response to phase changes in their associated control transformers $CT_0$–$CT_4$ may be connected by conducting means 21, 22, 23, 24 and 25, respectively, to their respective double-stability trigger circuits.

The following chart indicates the phase of the error voltage in each of the control transformers $CT_0$ through $CT_4$, inclusive, for each of the increments of one shaft rotation.

CHART A

| Increments of Shaft Rotation | Error Voltage Phase | | | | |
|---|---|---|---|---|---|
| | $CT_0$ | $CT_1$ | $CT_2$ | $CT_3$ | $CT_4$ |
| 0 (0°) | In | Out | Out | Out | Out |
| 1 (36°) | In | In | Out | Out | Out |
| 2 (72°) | In | In | In | Out | Out |
| 3 (108°) | In | In | In | In | Out |
| 4 (144°) | In | In | In | In | In |
| 5 (180°) | Out | In | In | In | In |
| 6 (216°) | Out | Out | In | In | In |
| 7 (252°) | Out | Out | Out | In | In |
| 8 (288°) | Out | Out | Out | Out | In |
| 9 (324°) | Out | Out | Out | Out | Out |

Since the phase discriminators $D_0$ through $D_4$ produce output trigger pulses on their respective conducting means 21 through 25 only upon a change in the phase relation between the error voltage and the line voltage in their associated control transformers, the double-stability trigger circuits $T_{5-0}$ through $T_{9-4}$ alter their stability conditions at the times that the rotating shaft 10 passes through the null points in the error voltages in their associated control transformers.

Thus as the rotating shaft 10 starts from its zero position and proceeds through the first 36° of its travel, the double-stability trigger circuit $T_{5-0}$ is On and the trigger circuits $T_{6-1}$ through $T_{9-4}$, inclusive, are Off. As the rotating shaft 10 passes the 36° point, the error voltage in the control transformer $CT_1$ becomes in phase with the line voltage. This causes the phase discriminator $D_1$ to produce an output pulse on the conducting means 22 which triggers the double-stability trigger circuit $T_{6-1}$ to its On condition. As the rotating shaft 10 passes through the succeeding null points for the control transformers $CT_2$ through $CT_4$, inclusive, the trigger circuits $T_{7-2}$, $T_{8-3}$, and $T_{9-4}$ are triggered to their On conditions.

When the rotating shaft 10 passes through its 180° position, the error voltage in the rotor-secondary 19 of the control transformer $CT_0$ becomes out-of-phase with the line voltage. This change in phase causes the phase discriminator $D_0$ to produce an output pulse on the conducting means 21 which triggers the double-stability trigger circuit $T_{5-0}$ to its Off condition. In a similar manner, the succeeding increments of shaft rotation cause the double-stability trigger circuits $T_{6-1}$ through $T_{9-4}$ to switch to their Off conditions.

When the rotating shaft 10 has completed one rotation through 360°, another phase change occurs in the error voltage in the rotor-secondary 19 of the control transformer $CT_0$. This time the error voltage becomes in phase with the line voltage and the double-stability trigger circuit $T_{5-0}$ is switched to its On condition in response to the control pulse from the phase discriminator $D_0$ on the conducting means 21.

If the rotating shaft 10 reverses its direction of rotation, the double-stability trigger circuits $T_{5-0}$ through $T_{9-14}$ will be switched On and Off in the same manner as the switching caused by the forward direction of rotation of the rotating shaft 10. Further, the On and Off pattern of the double-stability trigger circuits $T_{5-0}$ through $T_{9-4}$ will be the same for both the forward and reverse directions of rotation. Since the double-stability trigger circuits need not be operated at any set frequency, it is apparent that there has been provided an electronic counting means that is unaffected by the speed of rotation of the rotating shaft 10 or by any variations in this speed.

The above discussion relates to the measurement of sub-multiples of one rotation of the shaft 10. Let us now consider what happens when the rotating shaft travels beyond or back through 360°. When the count in the register means comprising the double-stability circuits $T_{5-0}$ through $T_{9-4}$ passes from 9 to 0 or 0 to 9 in the incremental shaft positions, it is necessary that a carry be passed on to the higher order register means 8.

This is accomplished by means of the carry means 9, which may include a pair of pentode-type electron discharge devices connected as conventional coincidence gating devices 30 and 31, having a common output coupled to a conventional single-stability trigger circuit 32. The devices 30 and 31 may include control grids 34 and 35, respectively, which may be connected together and to the output of the double-stability trigger circuit $T_{9-4}$ by means of the conducting means 36 and 36a, in such a manner that the control grids 34 and 35 are biased below cut-off when the trigger circuit $T_{9-4}$ is in its On condition and are at their zero bias potential when the trigger circuit $T_{9-4}$ is in its Off condition. Thus the Off condition of the trigger $T_{9-4}$ partially enables the discharge devices 30 and 31.

The suppressor grid 38 of the pentode discharge device 30 may be coupled by means of a conducting means 39 to the double-stability trigger circuit $T_{5-0}$, in such a manner that a stability change of the trigger circuit $T_{5-0}$ from its Off to its On condition produces a positive pulse on the suppressor grid 38, thereby raising the suppressor grid 38 to its zero bias potential. If the trigger circuit $T_{9-4}$ is simultaneously in its Off condition, the pentode discharge device 30 is caused to conduct.

The suppressor grid 40 of the discharge device 31 may be coupled by the conducting means 41 to the double-stability trigger circuit $T_{5-0}$, in such a manner that a positive pulse is produced on the suppressor grid 40 when the double-stability trigger circuit $T_{5-0}$ switches from its On to its Off stability condition. This positive pulse on the suppressor grid 40 raises the grid potential, which is normally at a point below cut-off, to the zero bias condition. If there is a coincidence in time between the positive pulse on the conducting means 41 and the suppressor grid 40, and the zero bias condition on the control grid 35, i.e., the trigger $T_{5-0}$ switching from its On to its Off condition and the trigger $T_{9-4}$ in its Off condition, the discharge device 31 is caused to conduct.

The common output of the discharge devices 30 and 31 is coupled to the single-stability trigger circuit 32 through a common load resistor 42. When either one of the discharge devices 30 and 31 becomes conductive, the single-stability trigger circuit 32 is triggered to its unstable condition and then returns, after a predetermined time delay, to its stable condition. Upon its return to its stable condition, a positive-going pulse is developed in the load resistor 42. This pulse is capacitively coupled through the conducting means 44 to a triode discharge device 45 connected as a conventional inverter and is then passed on as a negative-going pulse to the higher order register means 8. The register means 8 may take any suitable form adapted for forward or backward operation and adapted to consist of one or more denominational orders.

In order to condition the higher order register means 8 for forward or backward operation when the rotating shaft 10 passes from the 9 to 0, or 0 to 9 incremental positions of shaft rotation, respectively, the switching device BF may include a conventional double-stability trigger circuit 50. The stability condition of the trigger circuit 50 may be under the control of two pentode-type electron discharge devices 51 and 52 having control grids 54 and 55, respectively, and suppressor grids 56 and 57, respectively, and connected as coincidence gating devices.

The output means for the discharge device 51 may include the load resistor 58 of the right hand triode section of the trigger circuit 50. The control grid 54 may be connected through the conducting means 36 to the trigger circuit $T_{9-4}$ and be adapted to be at its zero bias potential when the trigger circuit $T_{9-4}$ is in its Off condition and biased below cut-off when the trigger circuit $T_{9-4}$ is in its On condition. The suppressor grid 56 may be coupled through the conducting means 39 and 39a to the trigger circuit $T_{5-0}$ and be adapted to be raised to its zero bias potential by a positive pulse in the conducting means 39 as a result of the change in the stability condition of the trigger circuit $T_{5-0}$ from its Off to its On condition.

Accordingly, when there is a coincidence in time of the positive pulse in the conducting means 39 and the zero bias condition of the control grid 54, the discharge device 51 becomes conductive and causes a negative-going pulse to be developed in the load resistor 58. Therefore, if the trigger circuit 50 is at that time in its Off condition, it will be triggered to its On condition.

When the trigger circuit 50 is switched to its On condition, the voltage drop across a load resistor 59 for the left hand triode section decreases, since the left hand triode section then becomes non-conductive. As a result of this decrease in the voltage drop across the load resistor 59, the voltage drop increases across a biasing resistor 60, which is in series relation with the load resistor 59 between the positive plate supply terminal and a negative biasing terminal. This increase in the voltage drop across the biasing resistor 60 causes the potential on a conductor 61, which is connected to the positive side of the resistor 60, to become more positive. This increase in positive potential on the conductor 61, in turn, may be coupled through a triode-type electron discharge device 62 connected in a conventional cathode follower circuit, and a conducting means 64 leading to the higher order register means 8, so as to condition the higher order register means 8 for forward operation.

On the other hand, when the rotating shaft 10 is rotating in its reverse direction and passes from 0 to 9, in its incremental shaft position, the double-stability trigger circuit $T_{5-0}$ is switched to its Off condition and a positive pulse passes over the conducting means 41 and 41a to the suppressor grid 57 of the pentode discharge device 52. Since the trigger circuit $T_{9-4}$ is in its Off condition at this time and remains in that Off condition for the next 36° of backward movement of the rotating shaft 10, the control grid 55 of the pentode discharge device 52, which is coupled through the conducting means 36 and 36b to the trigger circuit $T_{9-4}$, is at its zero bias potential.

The output for the pentode discharge device 52 may include the load resistor 59 for the left hand triode section of the trigger circuit 50. Therefore, when the positive pulse on the conducting means 41 is coincident with the zero bias condition of the control grid 55 in the pentode discharge device 52, the discharge device 52 becomes conductive and triggers the trigger circuit 50 to its Off condition, if it is not already in that condition.

When the trigger circuit 50 is triggered to its Off condition, the voltage drop across the load resistor 58 for the right hand triode section of the trigger circuit 50 decreases. This decrease in the voltage drop across the load resistor 58 causes the voltage drop across a biasing resistor 65, which is in series relation with the load resistor 58 between the positive plate supply terminal and the negative biasing terminal, to increase. This increase in the voltage drop across the bias resistor 65 causes the potential of a conducting means 66, which may be connected to the positive side of the bias resistor 65 to become more positive. The more positive potential of the conducting means 66 may then be coupled to the higher order register means 8 through a triode-type electron discharge device 68, which may be connected in a conventional cathode follower circuit, and a conducting means 69, so as to condition the higher order register means 8 for backward operation.

As aforementioned the single-stability trigger circuit 32 in the carry means 9 is set for a predetermined time delay. This time delay is designed to be of sufficient duration to permit the switching device BF to operate to condition the higher order register means 8 for the appropriate forward or backward operation prior to the transmission of the carry pulse over the conductor 46 from the carry means 9 to the higher order register means 8.

The double-stability trigger circuits $T_{5-0}$ through $T_{9-4}$, inclusive, may include any suitable conventional means for providing a visible manifestation of the condition of the trigger circuits. For example, a conventional glow discharge tube may be included in each of the trigger circuits in such a manner as to be energized when the trigger circuit is in its On condition and darkened or deenergized when the trigger circuit is in its Off condition. Thus the trigger circuits $T_{5-0}$ through $T_{9-4}$ serve as a register or counter for the fractional positions of the shaft 10.

Figure 2:
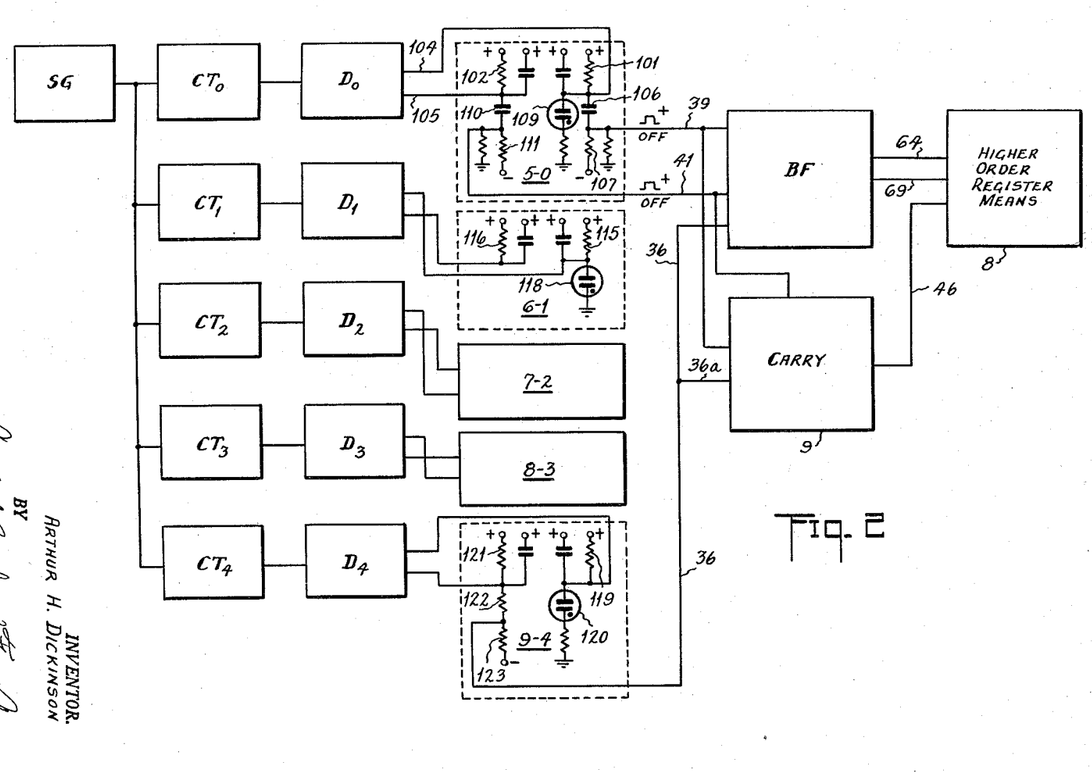
Fig. 2 is an electrical schematic diagram of an alternate embodiment of the invention.

Referring now to Fig. 2, the alternate system therein disclosed may include a synchro generator SG, synchro control transformers $CT_0$-$CT_4$, inclusive, phase discriminators $D_0$-$D_4$, inclusive, the switching device BF, the carry means 9 and the higher order register means 8, all of which may be identical with the similar components disclosed in Fig. 1 and be designed to operate in the same manner.

However, instead of the double-stability trigger circuits $T_{5-0}$ through $T_{9-4}$, inclusive, the system may include a plurality of control circuits 5-0, 6-1, 7-2, 8-3, and 9-4, corresponding in function to the double-stability trigger circuits for which they are substituted.

As aforementioned with relation to the phase discriminators $D_0$–$D_4$, inclusive, they may take any suitable form, such as that suggested in the Harper Patent No. 2,521,365. This type of circuit may be adapted to provide a positive signal for each phase condition of an input voltage with respect to a reference voltage.

Let us now consider the control circuit 5–0 which is associated with the phase discriminator $D_0$. The circuit 5–0 may comprise a load circuit including a load resistor 101, which is responsive to the in-phase condition of the error voltage in the control transformer $CT_0$ and the line voltage as detected by the phase discriminator $D_0$, and a load circuit including a load resistor 102, which is responsive to the out-of-phase condition of the error voltage and the line voltage as detected by the phase discriminator $D_0$.

The in-phase discriminator load resistor 101 may be coupled to the discriminator $D_0$ by a conducting means 104 which may be adapted to be at either one of two potentials, i.e., a high positive potential in response to an in-phase condition and a lower positive potential in response to an out-of-phase condition. The load resistor 102 may be coupled to the discriminator $D_0$ by a conducting means 105, which may be adapted to be at either one of two possible potentials, i.e., a high positive potential in response to an out-of-phase condition and a lower positive potential in response to an in-phase condition.

A capacitor 106 may be connected in series relation with the load resistor 101 and have one terminal connected to the load resistor 101 and its other terminal coupled through a resistor 107 to a negative bias terminal. The junction point between the capacitor 106 and the resistor 107 may be coupled to the conducting means 39 leading to the switching device BF and the carry means 9.

When the error voltage of the control transformer $CT_0$ becomes in-phase with the line voltage, the discriminator $D_0$ detects the change in phase and the potential of the conducting means 104 goes from its lower to the higher value. This decreases the voltage drop across the load resistor 101. A positive pulse is developed across the resistor 107, and passed to the switching device BF and the carry means 9 over the conducting means 39. The in-phase condition may be made manifest in the circuit 5–0 by means of a conventional glow discharge device 109, which may be coupled between the load resistor 101 and ground and be adapted to be energized in response to the higher voltage on the conducting means 104.

The out-of-phase condition of the error voltage and the line voltage in the control transformer $CT_0$ produces a positive pulse on the conducting means 41 in a similar manner. A capacitor 110 may be connected with one terminal to the load resistor 102 and its other terminal through a resistor 111 to the negative bias terminal and have the junction point between the capacitor 110 and the resistor 111 coupled to the conducting means 41.

Since the circuit means 6–1, 7–2 and 8–3 merely serve the purpose of manifesting the phase relation of the error voltage and line voltage in their associated control transformers $CT_1$, $CT_2$, and $CT_3$, respectively, they may each primarily comprise an in-phase load circuit including a load resistor 115 and an out-of-phase load circuit including a load resistor 116. Further, a conventional glow discharge device 118 may be connected between the load resistor 115 of the in-phase load circuit and ground, and be adapted to operate in the same manner as the glow discharge device 109 in the circuit 5–0.

As for the circuit 9–4, let us recall that the corresponding double-stability trigger circuit $T_{9-4}$ in Fig. 1, had two functions, viz., to manifest the phase relation of the error voltage and the line voltage in the associated control transformer $CT_4$, and to supply a control potential over the conducting means 36 to the switching device BF of the carry means 9 indicative of the Off condition of the trigger $T_{9-4}$ in Fig. 1, i.e., the out-of-phase condition of the error voltage in the control transformer $CT_4$. Therefore, the circuit 9–4 may comprise an in-phase load circuit including a load resistor 119 and a glow discharge device 120, connected in the same manner as the in-phase loads in circuits 6–1, 7–2 and 8–3, and an out-of-phase load including a load resistor 121.

The load resistor 121 may be connected in series relation with resistors 122 and 123 between a positive plate supply terminal and a negative bias terminal. The junction point between the resistors 122 and 123 may be coupled to the conducting means 36 leading to the switching device BF and the carry means 9. When the error voltage is out-of-phase with the line voltage in the control transformer $CT_4$, the voltage drop across the load resistor 121 is less than when the error voltage is in-phase with the line voltage, as is the condition across the load resistor 102 in the circuit 5–0. Thus the smaller voltage drop across the load resistor 121 causes a larger voltage drop to appear across the resistor 123, thereby producing a more positive voltage on the conducting means 36, which is indicative of the out-of-phase condition.

Thus there has been provided, in accordance with the invention, novel and improved counter apparatus responsive to the rotation of a shaft in either forward or backward directions of rotation, which is adapted to operate with the same degree of accuracy as that available in a conventional mechanical linkage and yet with the added ability to function accurately at any speed within an extremely wide range of speeds of rotation, regardless of any variation in that speed.

Referring now to Fig. 3, the quinary counter therein disclosed represents one denominational counting order and, it will be understood that it may be utilized in cascade relation with any suitable number of similar orders to form a register having a plurality of denominational orders. The counter may comprise five digital counter elements $T_{5-0}$, $T_{6-1}$, $T_{7-2}$, $T_{8-3}$, and $T_{9-4}$, and a supplementary counter element 200, all in ring counter relation, adapted to operate as a scale-of-ten circuit. Each of the digital counter elements and the supplementary counter element 200 may comprise a conventional double-stability trigger circuit, output means adapted to be operated in forward counting operations and output means adapted to be operated in backward counting operations.

Each of the counter elements is reset by any suitable reset means to the stability condition for the zero count as shown on the following chart B and indicated by the shading of the initially conductive triode sections of the double-stability trigger circuits. The reset means may comprise a conventional single-pole-single-throw, normally-closed switch, e.g., 196, 197, 198 or 199, in the control grid biasing circuit for the initially conductive triode section in each of double-stability trigger circuits in the counter elements $T_{5-0}$, $T_{6-1}$, $T_{9-4}$, and 200, respectively. It will be understood that counter elements $T_{7-2}$ and $T_{8-3}$ may include similar reset means.

CHART B

*Stability conditions of counter elements in Fig. 3*

| Count | $T_{5-0}$ | $T_{6-1}$ | $T_{7-2}$ | $T_{8-3}$ | $T_{9-4}$ | 200 |
| --- | --- | --- | --- | --- | --- | --- |
| 0 | On | Off | Off | Off | Off | Off. |
| 1 | Off | On | Off | Off | Off | Off. |
| 2 | Off | Off | On | Off | Off | Off. |
| 3 | Off | Off | Off | On | Off | Off. |
| 4 | Off | Off | Off | Off | On | Off. |
| 5 | On | Off | Off | Off | Off | On. |
| 6 | Off | On | Off | Off | Off | On. |
| 7 | Off | Off | On | Off | Off | On. |
| 8 | Off | Off | Off | On | Off | On. |
| 9 | Off | Off | Off | Off | On | On. |

Let us assume that the quinary counter of Fig. 3 is manifesting a zero count and that the potential on the conducting means 201, which is connected to a source of forward control potential, and the potential on the conducting means 202, which is connected to a source of backward control potential, are such that the quinary counter is conditioned for forward operation. A source 204 of negative pulses, which are to be counted, is connected to a conducting means 205 which is capacitively coupled to the control grid of the right hand triode section of each of the double-stability trigger circuits in the counter elements $T_{5-0}$ through $T_{9-4}$, inclusive. Therefore, the presence of a negative pulse on the conducting means 205 from the source 204 serves to return each of the counter elements $T_{5-0}$ through $T_{9-4}$ to its Off condition, if it is not already in that condition.

As seen from the chart B, at the zero count, the counter element $T_{5-0}$ is in its On condition, i.e., a conventional double-stability trigger circuit 206 included in the counter element $T_{5-0}$ is in its On condition with its right hand triode section conductive. The incidence of the first negative pulse from the source 204 upon the control grid 208 of the right hand triode section triggers the trigger circuit 206 to its Off condition.

Upon the change in stability condition of the trigger circuit 206, a positive-going pulse is developed across a load resistor 209 for the right hand triode section of the trigger circuit 206. The positive-going pulse is capacitively coupled to the forward output means 210 of the counter element $T_{5-0}$, including a conventional inverter stage having a control grid 211.

Since the quinary counter is assumed to be conditioned for forward operation, the more positive of two possible voltages appears on the conducting means 201 which is coupled through a resistor 212 to the control grid 211, thereby producing a reduced negative bias potential on the control grid 211 and partially enabling the forward output means 210. Thus when the positive-going pulse developed across the load resistor 209 of the trigger circuit 206 appears on the control grid 211, the forward output means 210 becomes conductive.

The forward output means 210 is coupled through a common load resistor 214 to a positive plate supply terminal in a conventional double-stability trigger circuit 215 of the counter element $T_{6-1}$. When the forward output means 210 becomes conductive, the resultant increased voltage drop across the load resistor 214 causes the trigger circuit 215 to switch to its On condition, with its right hand triode section conductive. Thus as a result of the incidence of the first negative pulse on the conducting means 205, the counter element $T_{5-0}$ has been switched to its Off condition, the counter element $T_{6-1}$ has been switched to in On condition and the counter elements $T_{7-2}$, $T_{8-3}$, $T_{9-4}$, and 200 remain in their Off conditions, as shown for the —1— count in chart B.

The second negative pulse on the conducting means 205 causes the counter element $T_{6-1}$ to operate in the same manner as the previously described operation of the counter element $T_{5-0}$ in response to the first pulse. More particularly, the trigger circuit 215 is triggered to its Off condition and a positive-going pulse is developed in the load resistor 214. This positive-going pulse is capacitively coupled through the forward output means 216 to the counter element $T_{7-2}$, where it switches that counter element to its On condition. Thus the second negative pulse on the conducting means 205 causes the counter elements to assume the stability conditions shown on the chart B for a —2— count. The third and fourth negative pulses on the conducting means 205 cause the counter to operate in a similar manner and produce the stability conditions representative of the —3— and —4— counts as shown in the chart B.

The fifth negative pulse causes the double-stability trigger circuit 218 of the counter element $T_{9-4}$ to return to its Off condition. In response to this stability change in the trigger circuit 218, a positive-going pulse is developed across the load resistor 219 in the usual manner. This positive-going pulse is capacitively coupled to a forward output means 220 including a conventional inverter stage having a control grid 221 and an output coupled through the load resistor 209 of the trigger circuit 206 in the counter element $T_{5-0}$ to the positive plate supply terminal. The forward output means 220 is partially enabled by means of the reduced negative bias potential upon the control grid 221 which is coupled to the conducting means 201. Thus the positive-going pulse developed across the load resistor 219 of the counter element $T_{9-4}$ triggers the trigger circuit 206 of the counter element 5-0 to its On condition.

At the same time, an auxiliary output means 222, including an inverter stage having a control grid 224 and a load including a load resistor 225, is made conductive, since the control grid 224 is directly connected to the control grid 221 of the forward output means 220. Conduction in the auxiliary output means 222 produces a negative-going pulse in the load resistor 225 thereof.

The negative-going pulse in the load resistor 225 is capacitively coupled in a conventional manner to a double-stability trigger circuit 226 in the supplementary counter element 200 and serves to trigger the trigger circuit 226 from one stability condition to the other.

Since a backward output means 227 of the supplementary counter element 200 is biased below cut-off, the positive-going pulse developed across a load resistor 228 for the left hand triode section of the trigger circuit 226 does not cause the conduction of the backward output means 227, which is capacitively coupled thereto. Although, a forward output means 229, which is capacitively coupled to a load resistor 230 for the right hand triode section, is partially enabled by the forward conditioning potential on the conducting means 201, there is no conduction by the forward output means 229, since a negative-going pulse is developed in the load resistor 230 when the trigger circuit 226 switches from its Off to its On condition. Therefore, the stability conditions of the counter elements have been modified in accordance with the —5— count as shown in the chart B, as a result of the fifth negative pulse on the conducting means 205.

The incidence of the sixth, seventh, eighth and ninth negative input pulses on the conducting means 205 causes the counter elements $T_{5-0}$, $T_{6-1}$, $T_{7-2}$, $T_{8-3}$, and $T_{9-4}$ to operate in the same pattern as previously discussed with relation to the first four negative input pulses. However, the supplementary counter element 200 remains in its On condition for these counts, thereby distinguishing the counts six through nine from the counts one through four, respectively.

In accordance with conventional electronic counter techniques, after one order has counted through a complete cycle or pattern of operation, it is necessary to provide a carry to the next higher counting order at the same time that the lower order starts its next cycle or pattern of operation. This is achieved, in accordance with the invention, in the following manner. When the tenth pulse is incident on the conducting means 205, the trigger circuit 218 in the counter element $T_{9-4}$ is returned to its Off condition.

As discussed with regard to the fifth negative pulse incident on the conducting means 205, this change in stability has two functions. First, the forward output means 220 is made conductive in response to the positive-going pulse in the load resistor 219 of the trigger circuit 218 and causes the trigger circuit 206 in the counter element $T_{5-0}$ to change to its On stability condition. Second, the carry output means 222 becomes conductive and a negative-going pulse is developed in the load resistor 225. This negative-going pulse is capacitively coupled to the trigger circuit 226 in the supplementary counter element 200 and causes the trigger circuit 226 to return to its Off condition.

When this occurs, a positive-going pulse is developed across the load resistor 230 of the right hand triode section of the trigger circuit 226. The positive-going pulse is capacitively coupled to the forward output means 229 and causes the output means 229 to conduct. This results in the development of a negative-going pulse in the common load resistor 231 for the forward output means 229 and the backward output means 227. This negative-going pulse is then passed on to the next higher register order over a conducting means 232, as a carry.

Let us now discuss the backward operation of the quinary counter in Fig. 3. Assuming that the counter elements are in the stability conditions shown in chart B for a —0— count, it will be apparent that the subtraction of a count of one from the counter requires that the counter elements be caused to manifest the stability conditions representative of the —9— count as shown in the chart B and that a carry must be passed on to the next higher counter or register order, so as to subtract a count of one from that order.

This is accomplished, in accordance with the invention, by conditioning the quinary counter for backward operation and then merely applying the desired number of negative pulses to the conducting means 205 for subtraction from the count manifested by the quinary counter. When the counter of Fig. 3 is conditioned for backward operation, the potential on the conducting means 202 is made sufficiently positive to partially enable the backward output means in each of the counter elements $T_{5-0}$, $T_{6-1}$, $T_{7-2}$, $T_{8-3}$, and $T_{9-4}$, and the supplementary counter element 200. At the same time, the potential on the conducting means 201 is made less positive, so as to disable each of the forward output means in their respective counter elements.

With this in mind, let us consider the incidence of the first negative pulse on the conducting means 205, which is to be subtracted from the counter. Since the counter is manifesting a —0— count, the trigger circuit 206 of the counter element $T_{5-0}$ is in its On condition. Therefore, the incidence of the negative pulse on the conducting means 205 causes the trigger circuit 206 to return to its Off condition. The change in stability of the trigger circuit 206 produces a positive-going pulse in the load resistor 209 of the right hand triode section of the trigger circuit 206. This positive-going pulse is capacitively coupled to a backward output means 240 having a load circuit including the load resistor 219 in the trigger circuit 218 of the counter element $T_{9-4}$ and causes the backward output means 240 to become conductive. Thus a negative-going pulse in the load resistor 219 of the trigger circuit 218 is produced and causes the trigger circuit 218 to switch to its On condition.

It will be remembered that the control grid 224 of the auxiliary output means 222 in the counter element $T_{9-4}$ is directly connected to the control grid 221 of the forward output means 220. Therefore, the lower potential on the conducting means 201 which serves to disable the forward output means 220 also serves to disable the auxiliary output means 222.

However, another auxiliary output means 241 may be located in the counter element $T_{5-0}$ and have a control grid 242, connected to the control grid 239 of the backward output means 240. The auxiliary output means 241 is partially enabled by the potential on the conducting means 202 which partially enables the backward output means in each of the counter elements. Thus the positive-going pulse developed across the load resistor 209 is also capacitively coupled to the control grid 242 of the auxiliary means 241.

The load circuit for the auxiliary output means 241 may include the load resistor 225 in common with the auxiliary means 222 in the counter element $T_{9-4}$. A negative-going pulse is developed across the load resistor 225 and is capacitively coupled to the trigger circuit 226 of the supplementary counter element 200, so as to cause the counter element 200 to switch from its Off condition, representative of the —0— count, to its On condition representative of the —9— count.

When this change in the stability of the trigger circuit 226 occurs, a positive-going pulse is developed in the load resistor 228 of the left hand triode section of the trigger circuit 226 and is capacitively coupled to the backward output means 227. In response to this positive-going pulse on the load resistor 228, the backward output means 227 becomes conductive and the negative-going pulse is developed across the load resistor 231 common to both the forward output means 229 and the backward output means 227. This negative-going pulse is then passed over the conducting means 232, as a carry. Thus the stability conditions of the counter elements have been changed from that shown for the —0— count to that required for the —9— count in the chart B.

The next negative-going pulse incident on the conducting means 205 restores the trigger circuit 218 in the counter element $T_{9-4}$ to its Off condition. In response to this change in the stability condition of the trigger circuit 218, a positive-going pulse is developed across the load resistor 219 and is coupled to a backward output means 244. This positive-going pulse causes the backward output means 244 to become conductive. The conduction of the backward output means 244 causes a trigger circuit in the counter element $T_{8-3}$ to go from its Off to its On condition, in the same manner as the conduction of the output means in the other counter elements cause the operation of succeeding counter elements. Thus the second negative pulse has caused the counter elements to switch from the stability conditions for the —9— count to that of the —8— count, as shown in chart B.

The third, fourth, and fifth negative pulses cause the operation of the counter elements in a similar manner to produce the stability conditions indicated in the chart B for the —7—, —6—, and —5— counts, respectively.

As shown by the chart B, when the counter elements are in the stability condition for the —5— count, the counter element $T_{5-0}$ is On and the supplementary counter element 200 is On. The other counter elements are Off. The incidence of the sixth negative pulse on the conducting means 205 causes the trigger circuit 206 in the counter element $T_{5-0}$ to return to its Off condition. In the manner previously described with relation to the change from a —0— count to a —9— count, this change in stability condition causes the trigger circuit 218 in the counter element $T_{9-4}$ to go to its On condition.

Further, the change in stability condition of the trigger circuit 206 causes the auxiliary means 241 to become conductive. This results in the production of a negative-going pulse in the load resistor 225, which is capacitively coupled to the trigger circuit 226 in the supplementary counter element 200. The trigger circuit 226 then returns to its Off condition in response to this negative-going pulse. When this occurs a positive-going pulse is developed in the load resistor 230 for the right hand triode section of the trigger circuit 226. However, since the forward output means 229 is disabled by the lower potential on the conducting means 201, a negative-going carry pulse is not produced across the common load resistor 231 for the forward and backward output means, 229 and 227.

Thus there has been provided in accordance with the invention, a novel and improved quinary counter, which is adapted to operate in both forward and backward directions with the count manifested by the individual counter elements for either direction of operation maintaining the same pattern.

It will be obvious to those skilled in the art that the above disclosed embodiments are meant to be merely exemplary and that they are susceptible of modification and variation without departing from the spirit and scope of the invention. For example, conventional glow discharge devices may be incorporated in each of the counter elements $T_{5-0}$, $T_{6-1}$, $T_{7-2}$, $T_{8-3}$, $T_{9-4}$ and 200 to provide visual manifestations of the count. Thus it will be understood that the invention is not to be limited except as defined by the appended claims.

I claim:

1. Electrical counting apparatus having at least one denominational counting order for measuring rotational movement of a rotating shaft, comprising means in said at least one order for producing a plurality of continuous voltage signals respectively having different phase relation representative of the rotational position of said shaft relative to different fractional increments of a complete revolution of said shaft, means for determining the phase relation of each of said voltage signals with respect to a given voltage signal, and counting means responsive to the phase relation of each of said plurality of voltages with respect to said given voltage for determining the rotational position of said shaft.

2. Electrical counting apparatus having at least one denominational counting order for measuring rotational movement of a rotating shaft, comprising means in said at least one order for producing a plurality of continuous voltage signals respectively having different phase relation representative of the rotational position of said shaft relative to different fractional increments of a complete revolution of said shaft, discriminator means for determining the phase relation of each of said voltage signals with respect to a given voltage signal, and counting means responsive to the phase relation of each of said plurality of voltage signals with respect to said given voltage signal as determined by said discriminator means for determining the rotational position of said shaft.

3. Electrical counting apparatus having at least one denominational counting order for measuring rotational movement of a rotating shaft, comprising means in said at least one order for producing a plurality of continuous voltage signals respectively having different phase relation representative of the rotational position of the shaft with respect to different fractional increments of a complete revolution of said shaft, discriminator means for determining the phase relation of each of said voltage signals with respect to a given voltage signal, first counting means responsive to the phase relation of each of said plurality of voltage signals with respect to said given voltage signal as determined by said discriminator means for determining the rotational position of said shaft, and second counting means responsive to the operation of said first counting means for determining the number of complete revolutions made by said rotating shaft from a predetermined starting position.

4. Electrical counting apparatus for measuring rotational movement of a rotating shaft, comprising synchro generator means responsive to the rotation of said rotating shaft, a plurality of synchro control transformers coupled to said synchro generator means, each of said synchro control transformers having a rotor-secondary and having the axial position of said rotor-secondary angularly displaced from a predetermined zero position at different fractional increments of a half revolution from said predetermined zero position, so that said control transformers produce different error voltage signals representative respectively of the rotational position of said shaft relative to different fractional increments of a complete revolution, discriminator means for determining the phase relation of each of said error voltage signals with respect to a given voltage signal, and counting means associated with each of said synchro control transformers and responsive to the phase relation of said plurality of error voltage signals with respect to said given voltage signal as determined by said discriminator means for determining the location of said shaft with respect to said fractional increments of a complete revolution.

5. Electrical counting apparatus having at least one denominational counting order for measuring rotational movement of a rotating shaft, comprising means in said at least one order for producing a plurality of continuous voltage signals respectively having different phase relation representative of the rotational position of said shaft relative to different fractional increments of a complete revolution of said shaft, discriminator means for determining the phase relation of each of said voltage signals with respect to a given voltage signal, and counting means having a plurality of stages with alternate conditions responsive respectively to in-phase and out-of-phase conditions of each of said voltage signals as determined by said discriminator means for determining the rotational position of said shaft.

6. Electrical counting apparatus as described in claim 5, wherein each of said plurality of stages of said counting means includes double-stability trigger circuits corresponding to said different fractional increments.

7. Electrical counting apparatus having at least one denominational counting order for measuring rotational movement of a rotating shaft, comprising a plurality of means in said at least one order for producing continuous variable voltage signals respectively having different phase relation representative of the position of said shaft relative to different fractional increments of a complete revolution of said shaft, discriminator means coupled to each of said voltage producing means for determining the phase relation of said variable voltage signal with respect to a reference voltage signal, individual counting means responsive respectively to the phase relation of each of said variable voltage signals relative to said reference voltage signal as determined by said discriminator means for selectively assuming in-phase and out-of-phase conditions, register means for determining the number of complete revolutions made by said rotating shaft from a predetermined starting position, and means responsive to a predetermined movement of said rotating shaft as determined by said individual counting means for operating said register means.

8. Electrical counting apparatus having at least one denominational counting order for measuring rotational movement of a rotating shaft, comprising a plurality of means in said at least one order for producing continuous variable voltage signals respectively having different phase relation representative of the position of said rotating shaft relative to different fractional increments angularly displaced throughout a complete revolution, a plurality of discriminator means, each of said discriminator means being coupled respectively to one of said variable voltage signal producing means for determining the phase relation of said variable voltage signal with respect to a reference voltage signal, a plurality of circuit means having selective operational conditions representative of in-phase and out-of-phase conditions, each of said circuit means being coupled to a different one of said discriminator means and responsive thereto, register means for determining the number of complete revolutions made by said rotating shaft from a predetermined starting position, means responsive to the operational conditions of two of said circuit means associated with two adjacent fractional increments for selectively conditioning said register means for forward and backward operation and for producing a control signal to operate said register means.

9. Electrical counting apparatus as described in claim 8, wherein said circuit means are double-stability trigger circuits.

10. Electrical counting apparatus for measuring rotational movement of a rotating shaft, comprising a synchro generator responsive to the rotational movement of said rotating shaft, a source of alternating current electrical energy for energizing said synchro generator, a plurality of synchro control transformers having rotor-secondaries, each of said rotor-secondaries having a fixed axial position angularly displaced by a different fractional increment from a predetermined zero position and adapted to produce a voltage signal representative of the rotational position of said shaft with respect to said fractional increment, a plurality of discriminator means, each of said discriminator means being responsive respectively to the voltage signal produced by said rotor-secondary in a different one of said control transformers and to a voltage signal from said source of electrical energy to determine the phase relation between said voltage signal in said rotor-secondary and said voltage signal from said source, a fractional counter circuit including a plurality of control circuit means, each of said control circuit means having in-phase and out-of-phase conditions and adapted to be responsive respectively to a different one of said discriminator means, a register means for determining the number of complete revolutions made by said rotating shaft from a predetermined starting position and adapted for forward and backward operations, means responsive to a predetermined rotational movement of said rotating shaft as determined by said fractional counting means for selectively conditioning said register means for forward and backward operation in response to the forward and backward rotational movement of said rotating shaft, and further means responsive to a predetermined rotational movement of said rotating shaft for producing a control signal to operate said register means.

11. Electrical counting apparatus as described in claim 10, wherein said control circuit means are double-stability trigger circuits.

12. Electrical counting apparatus having at least one denominational counting order for measuring rotational movement of a rotating shaft, comprising means in said at least one order for producing a plurality of continuous voltage signals respectively having different phase relation representative of the rotational position of said shaft relative to different fractional increments of a complete revolution of said shaft, and means for determining the phase relation of each of said voltage signals with respect to a given voltage signal and for determining the rotational position of said shaft in response to the phase relation of each of said plurality of voltages with respect to said given voltage.

13. Electrical counting apparatus having at least one denominational counting order, comprising means in said at least one order for producing a plurality of continuous voltage signals respectively of at least one different and continuously varying instantaneous characteristic representative of different incremental values of the respective counting order, and means for determining the relative instantaneous characteristic of each of said voltage signals with respect to a common given voltage signal and for determining the incremental value of said denominational order as a function of the instantaneous characteristics of said voltage signals relative to said given voltage.

14. Electrical counting apparatus having at least one denominational counting order, comprising means in said at least one order for producing a plurality of continuous voltage signals respectively of at least one different and continuously varying instantaneous characteristic representative of the different incremental values of the respective counting orders, respective means responsive to each of said plurality of continuous voltage signals for determining the relative instantaneous characteristic of each of said voltage signals with respect to a common given voltage signal, and means for determining the incremental values of said denominational order as a function of the instantaneous characteristics of said voltage signals relative to said given voltage.

References Cited in the file of this patent

UNITED STATES PATENTS

| | | |
|---|---|---|
| 2,481,347 | Riggen | Sept. 6, 1949 |
| 2,580,740 | Dickinson | Jan. 1, 1952 |
| 2,620,981 | Benson et al. | Dec. 9, 1952 |
| 2,656,460 | McMillan | Oct. 20, 1953 |
| 2,685,082 | Beman et al. | July 27, 1954 |
| 2,690,302 | Nolde | Sept. 28, 1954 |
| 2,691,100 | Moody et al. | Oct. 5, 1954 |
| 2,692,814 | Mathes et al. | Oct. 26, 1954 |
| 2,766,936 | Dimmer | Oct. 16, 1956 |
| 2,787,418 | Macknight et al. | Apr. 2, 1957 |